(12) United States Patent
Windorfer (10) Patent No.: US 11,789,451 B2
(45) Date of Patent: Oct. 17, 2023

(54) BASE STATION FOR A FLOOR PROCESSING DEVICE, DRIVE WHEEL FOR A FLOOR PROCESSING DEVICE AS WELL AS SYSTEM COMPRISED OF A BASE STATION AND A FLOOR PROCESSING DEVICE

(71) Applicant: Vorwerk & Co. Interholding GmbH, Wuppertal (DE)

(72) Inventor: Harald Windorfer, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 413 days.

(21) Appl. No.: 16/951,247

(22) Filed: Nov. 18, 2020

(65) Prior Publication Data
US 2021/0157328 A1 May 27, 2021

(30) Foreign Application Priority Data
Nov. 22, 2019 (DE) ...................... 10 2019 131 662.6

(51) Int. Cl.
*G05D 1/02* (2020.01)
*B60L 53/36* (2019.01)
*B60L 53/16* (2019.01)

(52) U.S. Cl.
CPC ............ *G05D 1/0225* (2013.01); *B60L 53/16* (2019.02); *B60L 53/36* (2019.02); *G05D 2201/0203* (2013.01)

(58) Field of Classification Search
CPC ....... G05D 1/0225; B60L 53/16; B60L 53/36; A47L 2201/02; B25J 9/0003
See application file for complete search history.

(56) References Cited

U.S. PATENT DOCUMENTS

| 10,383,499 | B2* | 8/2019 | Fox ........................ B25J 19/005 |
| 11,563,333 | B2* | 1/2023 | Towner ................ A01D 34/008 |
| 2004/0255425 | A1* | 12/2004 | Arai ...................... A47L 9/2873 |
| | | | 15/300.1 |
| 2009/0315501 | A1* | 12/2009 | Li .......................... B25J 19/005 |
| | | | 901/1 |
| 2012/0013907 | A1* | 1/2012 | Jung ........................ A47L 9/28 |
| | | | 356/438 |
| 2014/0060716 | A1* | 3/2014 | Windorfer ............... A47L 9/009 |
| | | | 152/209.15 |
| 2014/0289992 | A1* | 10/2014 | Ziegler ............... B60B 33/0057 |
| | | | 15/98 |

(Continued)

FOREIGN PATENT DOCUMENTS

DE 10 2008 009 617 A1 8/2009

*Primary Examiner* — Brian L Swenson
(74) *Attorney, Agent, or Firm* — Collard & Roe, P.C.

(57) ABSTRACT

A base station performs a service treatment on a floor processing device, wherein the base station has a basic housing with an interface for docking the floor processing device. In order to support docking in a purely mechanical way, the base station has a guide extension arm allocated to the interface and facing away from the basic housing with a predominant longitudinal extension for exclusively mechanically guiding a docking movement of the floor processing device to the interface, wherein an outer contour of the guide extension arm as observed in a vertical top view tapers proceeding from the basic housing up to a free end area of the guide extension arm facing away from the basic housing.

8 Claims, 3 Drawing Sheets

(56) References Cited

U.S. PATENT DOCUMENTS

2019/0100109 A1* 4/2019 Wendeborn ............. B60L 53/14
2019/0202064 A1* 7/2019 Wolff .................... A47L 9/2873
2020/0021122 A1* 1/2020 Lydon .................. H02J 7/0044

* cited by examiner

BASE STATION FOR A FLOOR PROCESSING DEVICE, DRIVE WHEEL FOR A FLOOR PROCESSING DEVICE AS WELL AS SYSTEM COMPRISED OF A BASE STATION AND A FLOOR PROCESSING DEVICE

CROSS REFERENCE TO RELATED APPLICATIONS

Applicant claims priority under 35 U.S.C. § 119 of German Application No. 10 2019 131 662.6 filed Nov. 22, 2019, the disclosure of which is incorporated by reference.

BACKGROUND OF THE INVENTION

1. Field of the Invention

The invention relates to a base station for performing a service treatment on a floor processing device, wherein the base station has a basic housing with an interface for docking the floor processing device.

In addition, the invention relates to a drive wheel for an automatically moving floor processing device, with a wheel body having a drive shaft, and a working tread formed on the wheel body in the circumferential direction.

Furthermore, the invention relates to a system comprised of a base station and an automatically moving floor processing device with at least two drive wheels.

2. Description of the Related Art

Automatically moving floor processing devices with drive wheels are known in the art. The drive wheels can basically be designed as described in DE 10 2008 009 617 A1, for example, and have a wheel body with a working tread.

Floor processing devices are used in households for automatic floor processing purposes, for example for floor cleaning and/or floor care. Floor processing devices are driven via the electric motor-driven drive wheels, further in particular via two independently controllable drive wheels.

Furthermore, it is known that floor processing devices can automatically approach a base station, so as to be serviced there, for example to charge an accumulator of the floor processing device, empty a dust collection chamber, change or receive an accessory or the like. To this end, floor processing devices known in prior art use software solutions that control a docking of the floor processing devices to the base station. In particular, it is known to equip the base station with optical markers, which can be read by a sensor of the floor processing device, so as to control the docking process.

The disadvantage to the systems described above is that the floor processing device must have complex software to steer the floor processing device very precisely to the interface of the base station, and for example to connect electrical contacts, suction channels, or the like.

SUMMARY OF THE INVENTION

Proceeding from the aforementioned prior art, it is therefore the object of the invention to facilitate the docking of the floor processing device to the base station, in particular to achieve docking with purely mechanical components, which replace a complex software control system for the docking process.

In order to achieve this object, it is proposed that the base station have a guide extension arm allocated to the interface and facing away from the basic housing with a predominant longitudinal extension for exclusively mechanically guiding a docking movement of the floor processing device to the interface, wherein an outer contour of the guide extension arm as observed in a vertical top view tapers proceeding from the basic housing up to a free end area of the guide extension arm facing away from the basic housing.

According to the invention, the base station has an elongated guide extension arm facing away from the basic housing, which expands toward the basic housing in relation to a docking direction of the floor processing device, so as to initially achieve a rough alignment of the floor processing device relative to the base station, and thereafter an increasingly precise adjustment. As a consequence, the outer contour of the guide extension arm as viewed perpendicularly from above is not designed as a rectangle overall, but rather is essentially wedge-shaped and/or trapezoidal, wherein the outer contour can only have a change in its width in relation to a specific longitudinal section of the guide extension arm. For example, the guide extension arm can be divided into two areas in the direction of its longitudinal extension, of which a first area nearest the basic housing of the base station has a rectangular configuration with outer edges oriented parallel to each other, and a second area further away from the basic housing has converging outer edges. The outer edges of the guide extension arm thus widen from the free end area of the guide extension arm as viewed in the direction of the basic housing. The widening can run continuously, discontinuously, straight, curved, or be otherwise shaped. A guide extension arm of the base station designed in this way serves to interact with a drive wheel of a floor processing device according to the invention to be described in more detail later, wherein the guide extension arm of the base station and the drive wheel of the floor processing device interact in such a way that the floor processing device is guided in a purely mechanical way to the interface of the base station, and can there dock in an optimal position. It is not necessary for the floor processing device to have directional control mechanisms that align the floor processing device relative to the interface in the area of the guide extension arm. This is accomplished just by the mechanical guidance of the guide extension arm and an adjustment component of the drive wheel according to the invention to be described later.

The base station further has a floor plate which can be traversed by the floor processing device, and on which the guide extension arm is formed or arranged. On the other hand, the base station could also be configured in such a way that the guide extension arm—without floor plate—rests directly on a floor surface. The proposed floor plate can basically be designed as a single part with the guide extension arm, or carry it as a separate element. In any event, the guide extension arm serves as a guide for at least one drive wheel of a floor processing device.

In addition, the end area of the guide extension arm have an outwardly facing run-on bevel relative to a horizontal view. In this embodiment, at least the free end area of the guide extension arm has an inclined peripheral edge, onto which a partial area of a drive wheel of the floor processing device can drive up more easily. The end area of the guide extension arm thus has no edge situated perpendicular to a floor surface or the floor plate of the base station that obstructs the drive wheel of the floor processing device as a step. The run-on bevel can have various configurations, for example be pointed or rounded.

Apart from the base station described above, the invention proposes a drive wheel for an automatically moving floor processing device, whose drive wheel has a wheel body that receives a drive shaft, and a working tread formed on the wheel body in the circumferential direction, wherein the wheel body has a cylindrical run-on element concentrically protruding on a wheel body end face, with a run-on tread formed on the run-on element in the circumferential direction, wherein a run-on tread diameter of the run-on tread is less than a working tread diameter of the working tread. The drive wheel according to the invention is designed to interact with a guide extension arm of a previously described base station in such a way that the floor processing device having the drive wheel can in a purely mechanical way be aligned relative to the interface of the base station and dock to the base station in a defined position and orientation, so as to receive a service treatment from the base station. For this purpose, the drive wheel has a wheel body, which in a conventional manner has a working tread on which the drive wheel usually rolls onto a surface to be processed. In addition, the drive wheel according to the invention now additionally also has a run-on element formed on the wheel body, which forms a disk-shaped projection on the wheel body end face that rotates with the wheel body concentrically around the drive shaft, but has a smaller diameter than the working tread of the wheel body itself. In relation to a section through the drive wheel running parallel to the drive shaft, the run-on element has a stepped transition to the remainder of the wheel body. The working tread of the wheel body and the run-on tread of the run-on element are preferably oriented parallel to each other, but the latter have a distance between each other relative to a radial direction proceeding from the drive shaft that is caused by the different diameters. In the process of docking the floor processing device to the base station, the run-on element allows a first drive wheel of the floor processing device to traverse an upper side of a guide extension arm of the base station, in particular when the floor processing device steers toward the base station at an inclination, specifically in such a way that the wheel body end face of the first drive wheel and the outer contour of the guide extension arm do not run parallel to each other. Since the run-on tread diameter of the run-on element that contacts the guide extension arm is smaller than the working tread diameter of the working tread of a second drive wheel rolling on a subsurface, the floor processing device is pulled in a desired docking direction as the first drive wheel runs onto the guide extension arm. This takes place due to the varying tread surface circumference of the drive wheels of the floor processing device, of which one rests with the working tread diameter on a floor surface in the usual manner, while the other one rests with the run-on tread diameter on the guide extension arm. Since both drive wheels rotate around the drive shaft with the same speed, but the distances they travel differ owing to the deviating tread circumferences, the floor processing device is deflected to the side of the device where the drive wheel whose run-on element rolls on the guide extension arm is arranged.

In addition, it is proposed that the run-on tread diameter measure roughly 70% to 90% of the working tread diameter. In particular, the run-on tread diameter can measure roughly 80% of the working tread diameter. The outer diameter of the run-on element is thus diminished by about 10% to 30%, in particular by 20%, relative to the outer diameter of the working tread. As a result, given a floor processing device standing on a floor surface in the usual manner, the run-on element has a sufficient distance to the floor surface, and does not contribute to a movement of the floor processing device. However, if the floor processing device steers toward the base station, a downwardly facing circumferential section of the run-on tread can come into contact with the upper side of the guide extension arm of the base station, and thereby contribute to realigning the floor processing device to the base station.

It is further proposed that the run-on tread of the run-on element have a run-on tread width of 2 mm to 10 mm in the axial direction. The width of the run-on tread determines the size of the contact area that is available for a contact between the run-on element of the drive wheel and the guide extension arm of the base station. In addition, the run-on tread width determines a maximum permissible angle between the drive wheel and the guide extension arm of the base station for establishing a contact, which provides a measure indicating the inclined position of the floor processing device relative to an optimal approach direction to the base station up to which the run-on tread of the drive wheel can still come into contact with the guide extension arm of the base station. It here holds true that the wider the run-on tread, the sooner an early contact can be established between the run-on tread and the guide extension arm. However, any contact arising between the run-on tread and the guide extension arm also depends on other parameters, including on how much the free end area of the guide extension arm tapers.

In addition, the invention proposes a system comprised of a base station described above and an automatically moving floor processing device with at least two drive wheels, wherein at least one drive wheel is designed as described above, and has a run-on element on a wheel body end face that faces the other drive wheel. Especially preferred is an embodiment in which the floor processing device has two identically configured drive wheels, each with a run-on element. As soon as the floor processing device gets onto the guide extension arm with one drive wheel, specifically the run-on element of the drive wheel, the floor processing device drives on the corresponding subsurface with varying tread circumferences of the two drive wheels, specifically with a first drive wheel on the guide extension arm on the one hand, and with a working tread of a second drive while on the subsurface carrying the guide extension arm on the other. Due to the varying tread circumferences, the floor processing device rounds a curve in the direction of the drive wheel whose run-on tread rolls onto the guide extension arm. The floor processing device again travels along a straight line when the second drive wheel also hits the guide extension arm with its run-on tread. For example, this can inevitably be achieved if the guide extension arm has a width that expands in the direction of the basic housing of the base station as viewed from above, as described above with respect to the base station. As a consequence, the guide extension arm expands with the floor processing device traveling in the direction toward the basic housing of the base station, so that a guide extension arm edge formed in the left traveling direction and a guide extension edge formed in the right traveling direction have an increasing distance from each other, until a maximum distance has been achieved which ensures that both drive wheels roll onto the guide extension arm with the run-on treads of their run-on elements. In this orientation, the floor processing device is then optimally aligned for coupling with the interface of the base station. Even though not preferred, it could alternatively be provided that the floor processing device only have one drive wheel configured according to the invention, and that a controller of the floor processing device take over the further alignment of the floor processing device relative to the interface of the base station as soon as the floor processing device was again deflected into the optimal traveling direction for docking to the interface by the drive wheel according to the invention coming into contact with the guide extension arm. In this configuration, the mechanical guidance of the guide extension arm and the controller of the floor processing device advantageously interact. In each case, it is proposed that the wheel body end face of the drive wheel having the run-on element be arranged on the floor processing device facing inward, i.e., such that the wheel body end face points in the direction of the opposing, concentrically arranged drive wheel. The base station and floor processing device of the system then interact in such a way that the floor processing device receives the guide extension arm between its drive wheels, so that the run-on element formed on a wheel body end face of a drive wheel faces in the direction of the guide extension arm, and can come into contact with the guide extension arm. The run-on element can then get onto the guide extension arm via a bevel of a peripheral edge of the guide extension arm, so that the run-on tread of the run-on element rolls onto the guide extension arm, and the drive wheel is thus lifted from a subsurface onto which it previously rolled.

In addition, it is proposed that the edge areas of the wheel body end faces of two opposing drive wheels bordering the working treads have an axial distance to each other that is greater than a maximum outer contour width of the outer contour of the guide extension arm oriented orthogonal to the longitudinal extension, so that the guide extension arm can be received between the drive wheels. Therefore, the floor processing device and the base station are correspondingly designed relative to each other in such a way that the guide extension arm fits precisely between the drive wheels of the floor processing device, specifically and preferably in such a way that the wheel body end faces are spaced apart from the guide extension arm with the least possible play, for example by only 1 mm, when the run-on treads of both drive wheels run onto the guide extension arm of the base station. This configuration forces the floor processing device into a straight approach direction relative to the basic housing of the base station. The guide extension arm expands on the way to the basic housing up to the maximum outer contour width of the outer contour of the guide extension arm, so that the guide extension arm widens until the maximum outer contour width has been reached. The maximum outer contour width preferably relates to a larger longitudinal section of the longitudinal extension of the guide extension arm, so that the guide extension arm is configured with optimally long parallel peripheral edges of the guide extension arm in a direction toward the basic housing of the base station. This ensures that the drive wheels of the floor processing device can roll on the guide extension arm in a directionally stable manner owing to the distance between the drive wheels and the constant maximum outer contour width of the guide extension arm in this longitudinal section.

In addition, it is proposed that the longitudinal extension of the guide extension arm be at least as large as an axial distance between two concentrically arranged drive wheels of the floor processing device. The length of the guide extension arm longitudinal extension thus preferably corresponds to at least the wheel distance of the floor processing device for providing the floor processing device with an adequate rolling path on the guide extension arm, which is sufficient for aligning the floor processing device relative to the base station before the floor processing device reaches the interface of the basic housing of the base station.

Finally, it is proposed that a vertical height of the guide extension arm be larger than half the difference in diameter between the run-on tread diameter and the working tread diameter, so that the drive wheel of the floor processing device is no longer supported on the working tread when the run-on tread rolls onto the guide extension arm. In other words, the vertical height of the guide extension arm when the working tread of the working wheel contacts the floor surface is larger than a distance between the partial area of the run-on element facing in the direction of the floor surface and the floor surface, so that in the event that the drive wheel with a run-on element rolls onto the guide extension arm, no more contact exists between the working tread and the floor surface. In order to ensure that the contact between the working tread and floor surface is lifted, it is sufficient that the vertical height of the guide extension arm be 0.5 mm or more larger than the difference between the radii of the working tread and run-on tread, for example.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
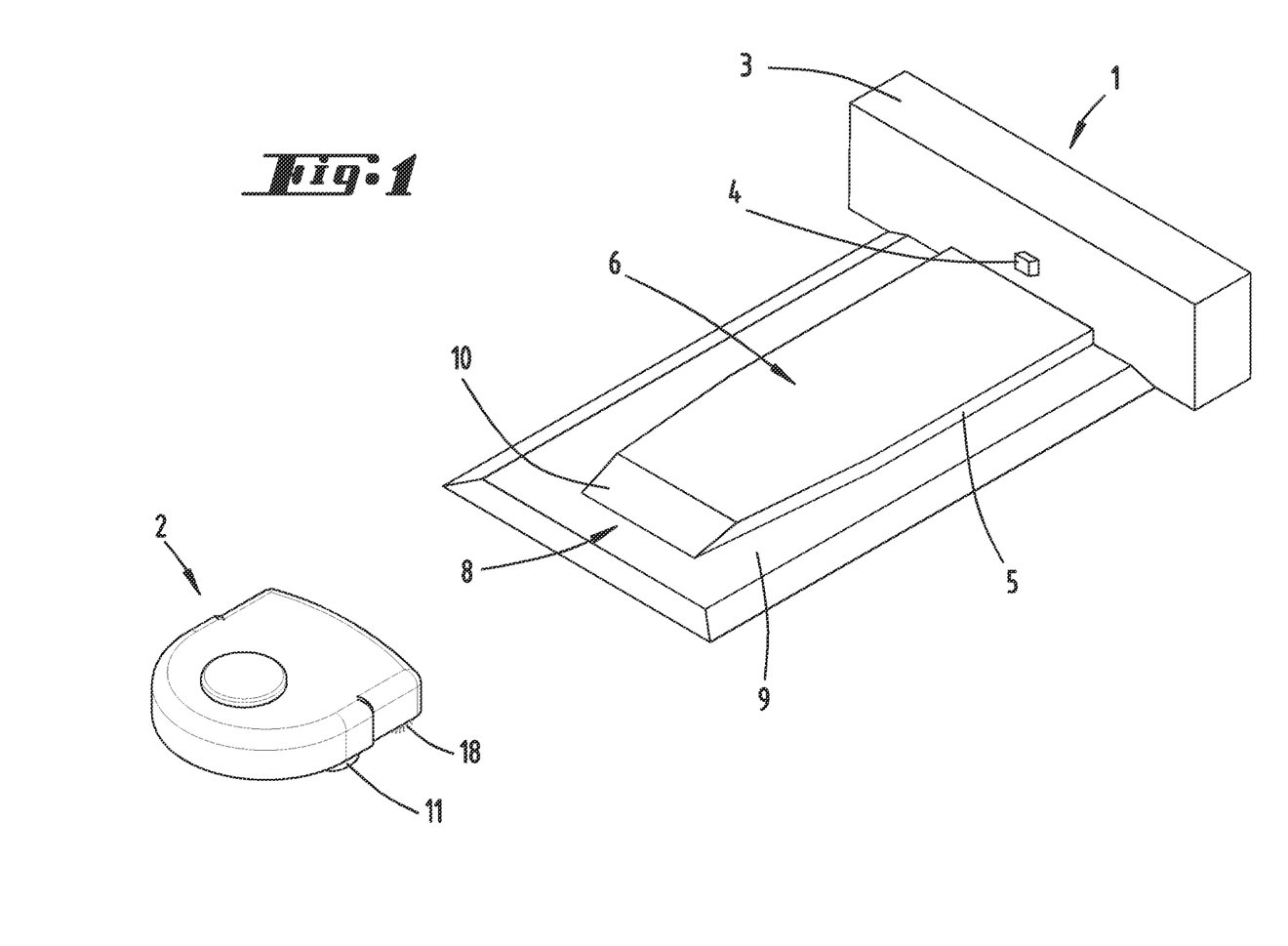
FIG. 1 is a system according to the invention comprised of a floor processing device and a base station.
Figure 2:
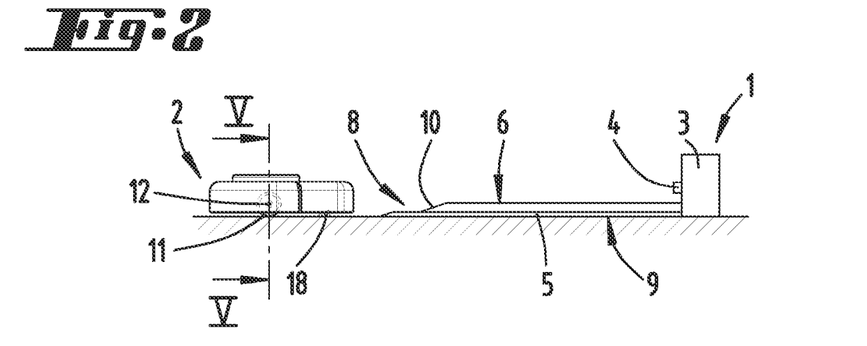
FIG. 2 is a side view of the system according to the invention.

FIG. 1 shows a possible embodiment of a system according to the invention comprised of a base station 1 and a floor processing device 2.

For example, the floor processing device 2 is here designed as an automatically moving cleaning robot, specifically for example a vacuuming robot. The floor processing device 2 has a floor processing element 18, here specifically for example a cleaning roller that rotates around a horizontal axis, as well as two motor-driven drive wheels 11, which are aligned concentrically to each other. For example, the drive wheels 11 here rotate around drive shafts 12, which drive the drive wheels 11 in the usual manner via a respective electric motor (not shown). In addition, the floor processing device 2 has an accumulator (not shown), which provides the power required for drive purposes, possibly along with additional electronic and electrical components of the floor processing device 2. The floor processing device 2 further has a controller for navigation and self-localization within an environment, which receives data from an environmental detection system. For example, the detection system can have a laser distance sensor, which measures distances to obstacles in the environment of the floor processing device 2. The controller can then generate an area map from the distances, which is used for navigation and self-localization by the floor processing device 2. The floor processing device 2 can have additional sensors apart from the distance sensor, for example an odometry sensor, which measures a movement of the floor processing device 2, contact sensors, ultrasound sensors, or others.

The base station 1 has a basic housing 3 with an interface 4, to which the floor processing device 2 can dock, for example to connect electrical contacts of the accumulator with electrical contacts of a charging device of the base station 1. Furthermore, the interface 4 can alternatively or additionally also have a flow channel coupling, which is suitable for establishing an airflow path between the floor processing device 2 and the base station 1, for example to transfer suction material from a suction material chamber of the floor processing device 2 into a station chamber of the base station 1. The base station 1 can basically have a plurality of different devices, so as to provide a service for one or several floor processing devices 2. For example, these devices include a charging device for the accumulator of the floor processing device 2, a suction fan, a suction material chamber, a storage system for device accessories, and others. For example, the base station 1 here further has a floor plate 9, onto which the floor processing device 2 can drive, so as to arrive at the interface 4 of the basic housing 3. The peripheral edges of the floor plate 9 preferably have a run-on bevel, so as to make it easier for the floor processing device 2 to climb onto the floor plate 9. Located on the floor plate 9 is a guide extension arm 6, which has a longitudinal extension 5 that faces away from the basic housing 3. The guide extension arm 6 has a free end area 8, which preferably is beveled, so that the floor processing device 2 can more easily navigate the guide extension arm 6. Even though not shown, a peripheral edge running parallel to the longitudinal extension 5 of the guide extension arm 6 can preferably be beveled. As an alternative to the exemplarily shown formation of the base station 1 with a floor plate 9, the guide extension arm 6 can also stand directly on a subsurface, so that the base station 1 with the guide extension arm 6 stands directly on a hard floor of the environment, for example.

Figure 3:
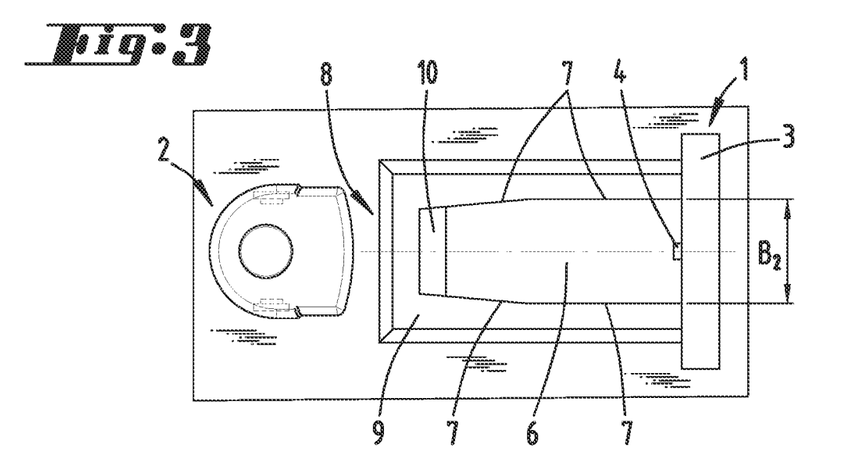
FIG. 3 is a top view of the base station.

FIG. 3 presents a detailed, vertical top view of the base station 1 with the floor plate 9 and the guide extension arm 6. As evident, the guide extension arm 6 has an outer contour 7, which has a tapered design in the direction of the end area 8. As a result, the contour 7 of the guide extension arm 6 deviates from a rectangular shape, and strictly by way of example here follows the configuration of a trapezoid. However, an area of the guide extension arm 6 facing the basic housing 3 is here preferably rectangular in design, so that the peripheral edges in this section run parallel to each other. Adjacent to the basic housing 3 of the base station 1, the guide extension arm 6 then has a maximum outer contour width $B_2$ as viewed perpendicularly from above. The outer edges of the outer contour 7 can also be shaped differently and expand starting from the free end area 8 in the direction of the basic housing 3. It is not necessary that the outer contour 7 run along a straight line and/or continuously. In particular, it can also be provided that the end area 8 or an area of the longitudinal extension 5 of the guide extension arm 6 close to the end area be curved.

Figure 4:
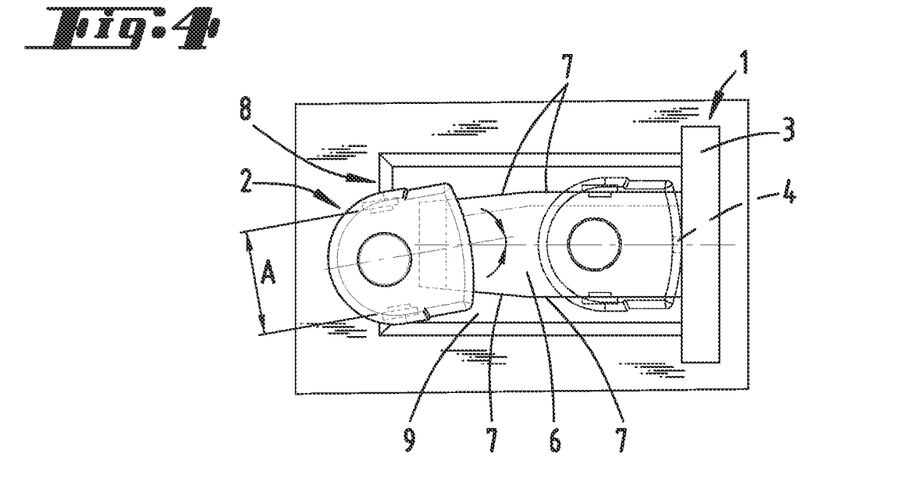
FIG. 4 is a top view of the base station with the floor processing device.

FIG. 4 shows the floor processing device 2 as it approaches the interface 4 of the base station 1. The drive wheels 11 are driven so as to move the floor processing device 2. The drive wheels 11 here have a distance A to each other that is measured from the facing wheel body end faces 15, specifically those radial partial areas of the wheel body end faces 15 which border a working tread 14 of the drive wheels 11. FIG. 4 shows the floor processing device 2 with a traveling direction/orientation that is not aligned parallel to that of the outer contour 7 of the guide extension arm 6. The guide extension arm 6 is designed in such a way that the floor processing device 2, while moving parallel to the longitudinal extension 5 of the guide extension arm 6 or its axis of symmetry, is optimally aligned as it moves toward the interface 4 of the basic housing 3, and can there dock, in particular without tilting the device housing. For example, if the floor processing device 2 has completed a vacuuming task, it usually moves toward the base station 1 as depicted. In most cases, it here does not approach the base station 1 parallel to the guide extension arm 6, and travels toward the floor plate 9, and there toward the guide extension arm 6, while retaining the approach angle. The positioning run starts there, during which the floor processing device 2 is subsequently maneuvered into the defined docking position on the interface 4, so that corresponding contact areas of the floor processing device 2 and the interface 4 can be connected with each other. In order to achieve the maneuvering movements required for an optimal docking, the floor processing device 2 first hits the guide extension arm 6 of the base station 1 at an inclination with one of the drive wheels 11.

Figure 5:
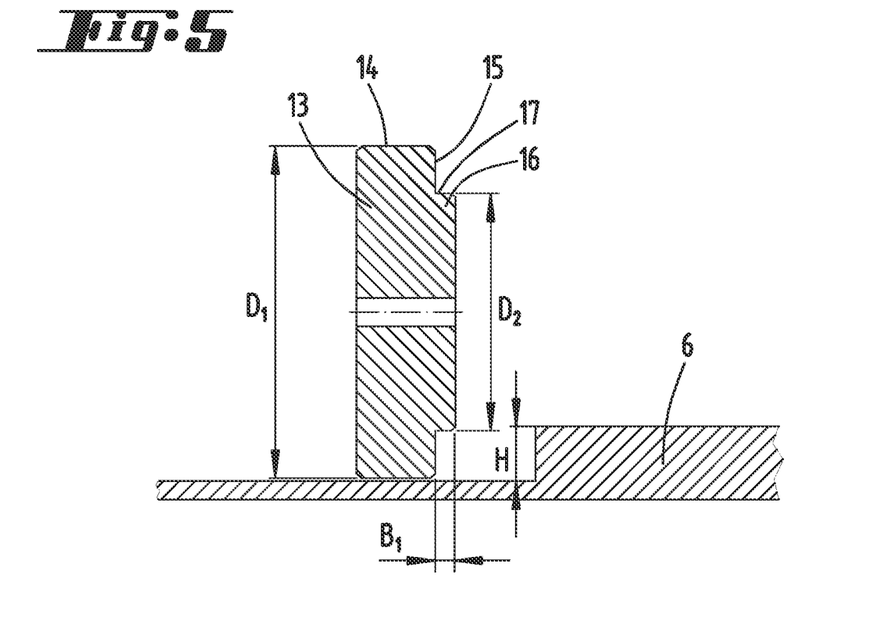
FIG. 5 is a sectional view through a drive wheel of the floor processing device and a guide extension arm of the base station.
Figure 6:
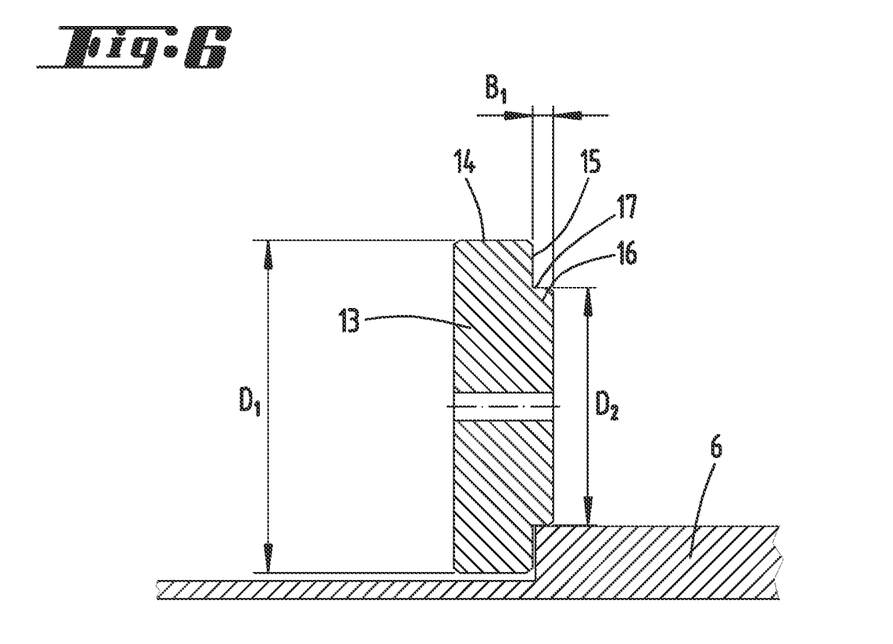
FIG. 6 is a sectional view of the drive wheel rolling onto the guide extension arm.

FIGS. 5 and 6 show how the drive wheel 11 interacts with the guide extension arm 6 of the base station 1, wherein FIG. 5 shows a state in which the drive wheel 11 does not yet contact the guide extension arm 6, and wherein FIG. 6 shows a state in which the drive wheel 11 has traveled up the guide extension arm 6. The drive wheel has a wheel body 13 that provides a working tread 14 in a conventional manner, by means of which the drive wheel 11 rolls onto a surface. The working tread 14 has a working tread diameter $D_1$. Designed as a single piece with the wheel body 13 here, a run-on element 16 adjoins the wheel body 13, and provides a run-on tread 17. The run-on tread 17 has a run-on tread diameter $D_2$. As shown on FIG. 4, the run-on element 16 is located on the wheel body end face 15 of the wheel body 13 that faces the concentric, opposing drive wheel 11. While the working tread 14 serves to move the floor processing device 2 during a usual operation, the run-on tread 17 of the run-on element 16 is used for rolling the drive wheel 11 onto the guide extension arm 6 of the base station 1, as a result of which—as explained below—an alignment of the floor processing device 2 relative to the interface 4 of the base station 1 can be achieved. The guide extension arm 6 has a height H corresponding to the run-on tread 17 of the run-on element 16 that has somewhat larger dimensions than the distance between the subsurface, here the floor plate 9 of the base station 1, and the circumferential partial area of the run-on tread 17 facing the subsurface. As a result, the working tread 14 is no longer in contact with the floor plate 9 as soon as the drive wheel 11 moves onto the guide extension arm 6 by means of the run-on element 16. The run-on element 16 of the drive wheel 11 has a run-on tread width $B_1$ that preferably measures several millimeters, so as to achieve a sufficient contact between the run-on element 16 and the upper side of the guide extension arm 6.

As shown on FIG. 4, the floor processing device 2 initially hits the guide extension arm 6 with only one drive wheel 11 as it moves at an inclination toward the base station 1. The run-on element 16 here bumps against a lateral edge of the outer contour 7 of the guide extension arm 6, and can traverse the guide extension arm 6, but in particular a beveled peripheral edge of the outer contour 7. The drive wheel 11 then rolls on the guide extension arm 6 by means of the run-on tread 17 of the run-on element 16, and thereby is lifted from the floor plate 9 of the base station 1, so that the working tread 14 is no longer in contact with the floor plate 9. In this situation, the other drive wheel 11 of the floor processing device 2 still stands on the floor plate 9 with its working tread 14. Because the working tread diameter $D_1$ of the working tread 14 of the one drive wheel 11 and the run-on tread diameter $D_2$ of the run-on element 16 of the other drive wheel 11 differ given an identical angular velocity of the drive wheels 11, the floor processing device 2 moves around a curve in the direction of the drive wheel 11 that rolls onto the run-on element 16, specifically with the tread surface that has the smaller tread diameter. The floor processing device 2 only starts traveling straight along the longitudinal extension 5 of the guide extension arm 6 once the second drive wheel 11 of the floor processing device 2 also rolls on the guide extension arm 6 with its run-on element 16. This inevitably takes place as the result of the outer contour 7 of the guide extension arm 6 expanding in the direction of the basic housing 3 proceeding from the end area 8 of the guide extension arm 6, wherein the maximal outer contour width $B_2$ of the outer contour 7 has here reached roughly a device length of the floor processing device 2 before the basic housing 3 of the base station 1, so that the outer contour width $B_2$ of the guide extension arm 6 in this area essentially corresponds to the axial distance A of the drive wheels 11. The axial distance A is here measured starting from the partial areas of the wheel body end faces 15 that lie next to the run-on element 16. "Essentially" here means that the drive wheels 11 fit as closely as possible to the guide extension arms 6, but a certain movement play is present, so as to prevent a resistance-inducing grinding of the drive wheels 11 on the guide extension arm 6. Finally, the maximum outer contour width $B_2$ of the guide extension arm 6 results in both drive wheels 11 rolling onto the guide extension arm 6 with the run-on treads 17 of the run-on elements 16, and being optimally aligned relative to the interface 4 of the base station 1, so as to connect corresponding interface elements of the base station 1 and the floor processing device 2.

Although only a few embodiments of the present invention have been shown and described, it is to be understood that many changes and modifications may be made thereunto without departing from the spirit and scope of the invention.

Reference List

| | |
|---|---|
| 1 | Base station |
| 2 | Floor processing device |
| 3 | Basic housing |
| 4 | Interface |
| 5 | Longitudinal extension |
| 6 | Guide extension arm |
| 7 | Outer contour |
| 8 | End area |
| 9 | Floor plate |
| 10 | Run-on bevel |
| 11 | Drive wheel |
| 12 | Drive shaft |
| 13 | Wheel body |
| 14 | Working tread |
| 15 | Wheel body end face |
| 16 | Run-on element |
| 17 | Run-on tread |
| 18 | Floor processing element |
| $D_1$ | Working tread diameter |
| $D_2$ | Run-on tread diameter |
| $B_1$ | Run-on tread width |

-continued

Reference List

| | |
|---|---|
| $B_2$ | Outer contour width |
| A | Distance |
| H | Height |

What is claimed is:

1. A system comprising an automatically moving floor processing device with at least two drive wheels, and a base station configured for performing a service treatment on the floor processing device,
wherein the base station comprises:
a basic housing with an interface configured for docking the floor processing device, and
a guide extension arm allocated to the interface and facing away from the basic housing with a longitudinal extension configured for exclusively mechanically guiding a docking movement of the floor processing device to the interface,
wherein an outer contour of the guide extension arm as observed in a vertical top view tapers proceeding from the basic housing up to a free end area of the guide extension arm facing away from the basic housing,
wherein at least one of the drive wheels comprises:
a wheel body having a drive shaft,
a working tread formed on the wheel body in a circumferential direction, and
a cylindrical run-on element concentrically protruding on a wheel body end face, with a run-on tread formed on the run-on element in the circumferential direction,
wherein a run-on tread diameter of the run-on tread is less than a working tread diameter of the working tread, and
wherein the run-on element faces the other drive wheel.

2. The system according to claim 1, further comprising a floor plate on which the guide extension arm is formed or arranged and which can be traversed by the floor processing device.

3. The system according to claim 1, wherein the end area of the guide extension arm has an outwardly facing run-on bevel relative to a horizontal view.

4. The system according to claim 1, wherein the run-on tread diameter measures approximately 70% to 90% of the working tread diameter.

5. The system according to claim 1, wherein the run-on tread of the run-on element has a run-on tread width of 2 mm to 10 mm in the axial direction.

6. The system according to claim 1, wherein edge areas of the wheel body end faces of two opposing drive wheels bordering the working treads have an axial distance to each other that is greater than a maximum outer contour width of the outer contour of the guide extension arm oriented orthogonal to the longitudinal extension, so that the guide extension arm can be received between the drive wheels.

7. The system according to claim 1, wherein the longitudinal extension of the guide extension arm is at least as large as an axial distance between two concentrically arranged drive wheels of the floor processing device.

8. The system according to claim 1, wherein a vertical height of the guide extension arm is larger than half a difference in diameter between the run-on tread diameter and the working tread diameter, so that the drive wheel of the floor processing device is no longer supported on the working tread when the run-on tread rolls onto the guide extension arm.

\* \* \* \* \*